(12) United States Patent
Lee et al.

(10) Patent No.: US 8,888,904 B2
(45) Date of Patent: Nov. 18, 2014

(54) HEAT GENERATING GRAPHITE SODIUM SILICATE COATING AGENT

(71) Applicants: Charley Lee, Virginia Beach, VA (US); Kae Chung, Chesapeake, VA (US)

(72) Inventors: Charley Lee, Virginia Beach, VA (US); Kae Chung, Chesapeake, VA (US)

(*) Notice: Subject to any disclaimer, the term of this patent is extended or adjusted under 35 U.S.C. 154(b) by 0 days.

(21) Appl. No.: 14/070,146

(22) Filed: Nov. 1, 2013

(65) Prior Publication Data

US 2014/0138572 A1    May 22, 2014

Related U.S. Application Data

(63) Continuation-in-part of application No. 13/694,310, filed on Nov. 19, 2012, now abandoned.

(51) Int. Cl.

| | |
|---|---|
| C09K 5/14 | (2006.01) |
| C09K 21/00 | (2006.01) |
| C06B 43/00 | (2006.01) |
| A62C 3/00 | (2006.01) |
| C09K 21/02 | (2006.01) |
| C09K 21/06 | (2006.01) |
| E04B 1/94 | (2006.01) |
| C09K 3/00 | (2006.01) |

(52) U.S. Cl.
CPC . *C09K 5/14* (2013.01); *C09K 21/00* (2013.01); *C06B 43/00* (2013.01); *A62C 3/00* (2013.01); *C09K 21/02* (2013.01); *C09K 21/06* (2013.01); *E04B 1/94* (2013.01); *C09K 3/00* (2013.01)
USPC .......................... 106/18.12; 252/70; 252/601

(58) Field of Classification Search
CPC ............ A62C 3/00; C06B 43/00; C09D 1/04; C09D 5/18; C09K 3/00; C09K 5/00; C09K 5/08; C09K 5/16; C09K 21/00; C09K 21/02; C09K 21/06; E04B 1/94
USPC ................................ 106/18.12; 252/70, 601
See application file for complete search history.

(56) References Cited

U.S. PATENT DOCUMENTS

| | | | | |
|---|---|---|---|---|
| 3,999,040 | A * | 12/1976 | Ellis | 219/543 |
| 4,015,386 | A * | 4/1977 | Cook | 52/232 |
| 4,534,886 | A * | 8/1985 | Kraus et al. | 252/502 |
| 4,586,999 | A * | 5/1986 | Goldsmith et al. | 204/265 |
| 4,783,586 | A * | 11/1988 | Takeda | 219/544 |
| 5,112,405 | A * | 5/1992 | Sanchez | 106/608 |
| 5,232,629 | A * | 8/1993 | Boffardi | 252/387 |
| 5,756,160 | A * | 5/1998 | Pratt | 427/397.7 |
| 5,851,504 | A * | 12/1998 | Barker et al. | 423/447.2 |
| 6,241,909 | B1 * | 6/2001 | Hayes | 252/70 |
| 6,452,138 | B1 * | 9/2002 | Kochman et al. | 219/549 |
| 6,511,767 | B1 * | 1/2003 | Calver et al. | 429/505 |
| 6,667,353 | B2 * | 12/2003 | Agostini et al. | 523/212 |
| 7,279,437 | B2 * | 10/2007 | Kai et al. | 442/136 |
| 7,655,580 | B2 * | 2/2010 | Majors | 442/136 |
| 7,933,114 | B2 * | 4/2011 | Baca et al. | 361/502 |
| 8,124,043 | B2 * | 2/2012 | Harutyunyan et al. | 423/447.1 |
| 2011/0192539 | A1 * | 8/2011 | Chick | 156/304.1 |
| 2012/0148831 | A1 * | 6/2012 | Kipp et al. | 428/323 |

\* cited by examiner

*Primary Examiner* — Anthony J Green
(74) *Attorney, Agent, or Firm* — Dale J. Ream

(57) ABSTRACT

This invention describes the processes of formulating heat generating graphite-sodium silicate (G-S) coating agents/mixes, and coating these mixes on base layer boards/panels to construct moderate to high surface temperature heating devices that are environmentally safe, fire retardant, and economically viable. The core to such heating devices is the formulation of G-S coating agents/mixes that are composed of graphite, sodium silicate, and aluminum silicate. In these coating mixes, the graphite is the primary heat generating agent, the sodium silicate is the main fire resisting agent, and the aluminum silicate primarily serves as surface heat control and water proofing functions.

12 Claims, 7 Drawing Sheets

HEAT GENERATING GRAPHITE SODIUM SILICATE COATING AGENT

REFERENCE TO RELATED APPLICATIONS

This application claims priority to and is a continuation-in-part of U.S. patent application Ser. No. 13/697,310, now abandoned, filed on Nov. 19, 2012 and titled Graphite and Sodium Silicate Heating Device and incorporates said application by reference.

FIELD OF THE INVENTION

This invention is related to the field of heating devices and, more particularly, to a heating device having a high surface temperature (120° to 250° C.) that is fire resistant. The core of the said heating device is a graphite-sodium silicate (G-S) coating agent that includes a combination of graphite (C), sodium silicate (Na2SiO3), and metal silicate (e.g., Al2SiO3, CrSiO3, CuSiO3, FeSiO3, MoSiO3, and NgSiO3) to accomplish this unexpected result.

BACKGROUND OF THE INVENTION

Carbon/graphite is commonly used as the heating element in various heating devices and/or as a part of electrodes because it is electrically conductive, anti-static, capable of dispersing electrical current evenly throughout the entire heating element, environmentally safe, inexpensive, and relatively easy to handle (e.g., Ellis, U.S. Pat. No. 3,999,040, Dec. 21, 1976; Klaus & Quick, U.S. Pat. No. 4,534,886, Aug. 13, 1985; Goldsmith et al., U.S. Pat. No. 4,586,999, May 6, 1986; Takeda, U.S. Pat. No. 4,783,586, Nov. 8, 1988; Barker et al., U.S. Pat. No. 5,851,504, Dec. 22, 1998: Kochman et al., U.S. Pat. No. 6,452,138, Sep. 17, 2002; Calver et al., U.S. Pat. No. 6,511,767 B1, Jan. 28, 2003; Baca et al., U.S. Pat. No. 7,933,114 B2, Apr. 26, 2011; and Harutyunyan et al., U.S. Pat. No. 8,124,043 B2, Feb. 28, 2012). When a carbonic material is mixed with water-based poly-acrylate, polyurethane, or polyethylene emulsion and is coated or laminated on non-woven fabric, fiberglass panel, plastic panel, or plywood, it results in a warm temperature heating pad within a range of 20°-50° C., which is suitable for keeping human bodies and pets warm (i.e., Lee et al., U.S. 61/743,556, Sep. 7, 2012).

If a heating device is going to be used for construction and industrial purposes such as heating panels, heating boards, space heaters, hanging heaters, and industrial dehydrators, it needs to achieve a higher surface heat generating capability. A manufacturer may increase the surface temperature of a conventional carbon-based heating device by: (a) introducing a higher electrical voltage to the heating element, (b) increasing the carbon content in the heating element, (c) using a metallic rather than non-metallic base layer coated with carbon, (d) shortening the distance between positive (+) and negative (−) electrodes on a heating element, and (e) adopting any combination of all the above options. The problem with any of these options is that, as the temperature raises to a level of 140° C. or higher, all the organic materials such as organic carbon, non-woven fabric, and plywood tend to oxidize, burn, smell, and cause environmental hazards.

In order to solve the above problem, this invention introduces fire retardant chemical compounds such as sodium silicate, aluminum silicate, aluminum hydroxide, sodium hydroxide, sodium colloidal silica, sodium sulfate, and other flame deterrents. Among these materials, the suitable choices include sodium silicate and aluminum silicate. Sodium silicate ($Na_2SiO_3$) is commonly known as water glass or liquid glass and has a number of desirable characteristics that can be beneficial for building construction materials, such as being fire resistant, high temperature adhesive, bonding/sealing capability, electrically conductive at a low level, anti-corrosive, and others. Additionally, it is inexpensive. Because of these unique properties, it has been widely used in manufacturing fire retardant and/or insulating materials (e.g, Cook, U.S. Pat. No. 4,015,386, Apr. 5, 1977; McLaren, U.S. Pat. No. 4,196,242, Apr. 1, 1980; Kai & Majors, U.S. Pat. No. 7,279,437 B2, Oct. 9, 2007; Majors, U.S. Pat. No. 7,655,580 B2, Feb. 2, 2010; Chick, Patent Application US 2011/0192539 A1, Aug. 11, 2011; Kipp et al., Patent Application US 2012/0148831 A1, June, 2012); anti-corrosive materials (Boffardi, U.S. Pat. No. 5,232,629, Aug. 3, 1993; Pratt, U.S. Pat. No. 5,756,160, May 26, 1998), water proofing concrete and masonry treatments (e.g., Sanchez, U.S. Pat. No. 5,112,405, May 12, 1992); and others. Aluminum silicate (Al2Sio3) is also inexpensive, electrically conductive, flame deterrent, and a waterproofing agent. As a result, it is often used as a heat absorption agent in temperature control devices (e.g., Hayes, U.S. Pat. No. 6,241,909 B1, Jun. 5, 2001; Erick et al., Patent EP 2038221 A2, Mar. 5, 2009).

While sodium silicate is widely used as fire retardant/insulation materials, its use in conjunction with carbon-based heating devices has not been previously appreciated. Even when these two materials are utilized jointly, the main focus of their uses has been on controlling carbon steel corrosion (Boffardi, U.S. Pat. No. 5,232,629, Aug. 3, 1993), protecting carbon composite materials on their surface (Pratt, U.S. Pat. No. 5,756,160, May 26, 1998), or reinforcing tire tread rubber compositions (Agostini et al., U.S. Pat. No. 6,667,353 B2, Dec. 23, 2003) in non-heating devices manufacturing industries. One possible reason may be that because sodium silicate is easily soluble in water, any finished product containing it can be easily water damaged. To deal with this possibility, this invention mixes sodium silicate with aluminum silicate or aluminum hydroxide. Aluminum silicate not only has heat absorption capability but also has coagulating capability. As such, it is often used as a waterproofing agent in construction industries.

This invention is intended to capitalize on the synergistic effect of graphite and sodium silicate in constructing heating devices. As discussed earlier, a problem of constructing a high temperature carbon-based heating device is that as it rises, the heating device tends to oxidize, burn, smell, and cause environmental hazards. In order to deal with this problem, this invention mixes graphite with sodium silicate to produce a fire resistant coating agent and coat or laminate it on the surface of an organic base layer material made of non-woven fabric, paper, or plywood for constructing moderate surface temperature heating boards (50°-120° C.) and on the surface of an inorganic base layer material made of cement, ceramic, fiberglass, plaster, or metal for high temperature heating boards (120°-250° C.). Such fire resistant heating devices do not burn and/or disintegrate at 250° C., which makes them excellent building materials.

Sodium silicate generally bonds well with most surface materials. In order to enhance the bonding quality, however, this invention uses inorganic graphite carbon rather than organic carbon source to mix it with inorganic sodium silicate. Because the chemical properties of inorganic graphite and inorganic sodium silicate are harmonious, they tend to bond naturally. Additionally, since sodium silicate is a high temperature adhesive, the coating agent that is composed of graphite and sodium silicate tends to bond well with any surface material including plywood, fiberglass, plaster board, cement and any road payment materials. This graphite-sodium silicate coating agent is an excellent source of materials for constructing heating devices with fire retardant capability.

In the embodiments of this invention, the surface temperature of heating devices can be controlled by: (a) changing the electrical voltage, (b) changing the composition of the coating agent (graphite-sodium silicate mix), (c) changing the thickness of the coating agent, (d) changing the length of the heating element, (e) adjusting the distance between positive (+) and negative (−) electrical wires placed on electrodes, and/or (f) changing the base layer of heating devices—non-woven fabric, plastic panel, plywood, plaster board, and metallic panel. Table 1 shows different compositions of heating devices at different temperature levels—warm, moderately, and high temperature.

TABLE 1

Differing Compositions of Heating Devices

| Surface Temperature | 20°-50° C. | 50°-120° C. | 120°-240° C. |
|---|---|---|---|
| Electrical voltage | 120 V | 120/240 V | 240 V |
| Carbon type | Organic | Inorganic | Inorganic |
| Chemical mix | Poly acrylic emulsion | Sodium silicate/ Aluminum silicate | Sodium silicate/ Aluminum silicate |
| Base layer material | Organic | Organic/Inorganic | Inorganic |
| Thickness of coating | 0.5-0.8 mm | 0.5-1.00 mm | 1.0-1.3 mm |
| Length of heating element | Longer | Longer/Shorter | Shorter |
| Distance between + & − electrodes | Longer | Longer/Shorter | Shorter |

As shown in Table 1, if a warm temperature heating device (20°-50° C.) is needed, the manufacturer may: (a) use a 120 volt electrical current, (b) use an organic carbon powder in the coating agent, (c) mix the organic carbon with water-based poly acrylic emulsion, (d) use an organic base layer such as non-woven fabric and plywood, (e) make the coating agent thinner on the heating element, (e) lengthen the size of the heating element, and/or (f) keep the distance between positive and negative electrical wires/electrodes longer. On the other hand, if a high temperature heating device (120°-250° C.) is needed, the manufacturer may: (a) use a 240 volts of electrical current, (b) use an inorganic graphite carbon in the coating agent, (c) use an inorganic base layer such as cement, ceramic, plaster, fiberglass and metal plate, (d) mix graphite with sodium silicate, (e) make the coating agent thicker on the heating element, (f) shorten the length of the heating element, and/or (f) shorten the distance between positive and negative electrical wires/electrodes. Moderately high temperature heating devices (50°-120°) need the mid-range options. Warm temperature (20°-50° C.) heating devices are basically used to keep human bodies or animals warm. Moderately high (50°-120° C.) to high temperature (120°-240° C.) heating devices can be used to construct heating panels/boards, hanging heaters, space heaters, industrial dehydrators, and others.

The main benefit of such heating devices is that they can cut the electric heating bills substantially. Conventionally, the entire house is heated by a centralized electrical heating, gas burning, or oil burning system. Unlike the centralized heating system, the graphite-sodium silicate based heating devices can be locally installed to heat the rooms in a house where heat is needed. For example, heating wall boards and/or heating floor mats can be permanently installed in frequently used rooms, while space heaters and/or wall hanging heaters can be utilized in infrequently used rooms. Or, the space heating heaters can be used in conjunction with a conventionally centralized heating system by placing them in rooms where an additional heat is needed. Such a strategic installment of graphite-sodium silicate based heating system is likely to reduce heating costs substantially. Additionally, an important benefit is that because the graphite-sodium silicate coating agent is electrically conductive, it naturally becomes an anti-static agent. So, the graphite-sodium based heating devices can be installed to heat buildings that require anti-static building materials. Consumer electronics, chemical, pharmaceutical, and military installations dealing ammunitions are such industries.

How safe are graphite, sodium silicate, and aluminum silicate? These materials have been around in the natural environment for many years without causing serious environmental and health risks. However, if graphite, sodium silicate, and/or aluminum silicate powders are/is inhaled, it can cause some irritation in the respiratory track and/or cause some damage in the lung and in the digestive system. Moreover, sodium silicate is essentially a strong alkaline that is harmful to human bodies. Alkaline is needed to neutralize acid in our body, but too much of it poses health risk. Also, if sodium silicate solution is touched, it can irritate the skin and eyes. Thus, people who handle these chemical compounds need to wear protective equipment such as gloves, goggles, and lab coat. A plant handling these chemicals needs to be well ventilated to dust off the chemical. Once they are mixed, the mix is coated on the base layer, and surface is dried, much of the health risk is neutralized. That means, the finished products are fire resistant, environmentally safe and seem to present no health risk.

The core of graphite-sodium silicate (G-S) based heating devices is an environmentally safe, fire retardant, and economically viable a graphite-sodium silicate (G-S) coating agent that can be coated on an organic or inorganic base board. Since we are aiming at constructing a variety of G-S based heating devices for personal and industrial uses, it would be desirable to develop a set of coating agents that are independently and collectively capable of generating a desired surface temperature for heating devices without causing fire hazard, health risk, and or material disintegration. Developing such coating agents is the main focus of the present CIP report.

SUMMARY OF THE INVENTION

The main purpose of our invention, including the early as well as present, is to construct moderate (50°-120° C.) to high surface temperature (120°-240° C.) heating devices. Such heating devices can be used as heating panels, heating boards, space heaters, and wall hanging heaters for home building industries; for removing snow and ice on driveways and airport runways; and industrial dryers or hydrators. To achieve this end, we first need to develop environmentally safe, fire retardant, and economically viable efficient coating agents that can be coated on the heating boards.

To be economically efficient, this invention utilizes a host of base materials that are readily available and inexpensive. These base materials include such chemicals as conductive carbon, graphite, sodium silicate, sodium sulfate, colloidal silicate, aluminum silicate, aluminum sulfate, aluminum hydroxide, copper sulfate, magnesium sulfate, and other hydrated salts; and a base layer material such as non-woven fabric, plywood, fiberglass, cement board, ceramic, plaster board, plastic panel, and other inexpensive metal plates. This invention also adopts a relatively simple manufacturing technology of mixing the needed chemical compounds, coating the mixed coating agent on non-woven fabric, plywood, plastic, plaster, fiberglass, cement, or metal board. Furthermore, because the manufacturing processes are relatively simple, they can be produced manually for small quantities or the processes can be automatized for mass production.

Unlike warm temperature heating pads that are used to keep human bodies warm, moderate to high temperature heating devices need to be fire resistant. Because warm temperature heating pads are made from organic based materials such as organic carbon, an organic base layer, and organic acrylic emulsion, they tend to oxidize, smell, and burn at a high temperature at around 140° C. To produce high temperature heating devices with fire resistant capability, this invention utilizes sodium silicate possessing fire retarding property. Additionally, the use of aluminum silicate provides waterproofing capability.

The unique feature of this invention is to mix graphite with sodium silicate or other hydrated salt compound. It utilizes graphite as a primary heat generating agent, sodium silicate as a primary fire resistant agent, and aluminum silicate as a waterproofing agent. When inorganic graphite is mixed with inorganic sodium silicate, these two chemical components bond well, and the resulting heating element carries the fire retarding property. Also, the graphite mixes well with aluminum silicate and provides waterproofing capability.

The benefits of graphite-sodium silicate (G-S) based heating devices are several: (a) they are functionally effective and economically efficient; (b) they can be locally and strategically installed in homes to reduce heating costs; (c) they are an industrial necessity in some industries that require antistatic building materials; and (d) they are environmentally safe and pose low health risk.

With further reference to the graphite-sodium silicate (G-S) coating agent of the present invention, carbon/graphite (C) is commonly used as the heating element in various heating devices and sodium silicate ($Na_2SiO_3$) is used as a fire retardant chemical element in manufacturing fire retardant and/or insulation materials. The use of carbon/graphite (C) as a heating element and sodium silicate ($Na_2SiO_3$) as fire retardant is known independently and separately. But, no one has yet to successfully combine these two components to produce high surface temperature infrared heating devices that generate high surface temperature and at the same time that are fire retardant. One reason is that because sodium silicate is easily soluble in water, any heating device containing it can be easily water damaged. To overcome this problem, as we did in this CIP Patent Application, a metallic silicate (e.g., $Al_2SiO_3$, $FeSiO_3$, $CrSiO_3$, $CuSiO_3$, $MoSiO_3$, or $MgSiO_3$) can be added to the G-S coating agent that has coagulating capability to prevent water damage when the G-S agent is coated and dried on a base layer board. The coagulated hardened surface serves a waterproofing function.

When the above G-S coating agent is coated on the surface of an organic base board made of non-woven fabric, paper board, plywood, or similar material, its surface temperature can rise to 120° C. without causing any fire hazard. When the G-S coating agent is coated on the surface of an inorganic base board made of cement, fiberglass, plaster, or similar material, its surface temperature can rise to 250° C. without causing any fire hazard. And when the G-S agent is coated on the surface of an inorganic base board made of ceramic or MICA plate, its surface temperature can rise to 500° C. and higher without causing fire hazard.

To be clear, graphite is a heat generating agent, sodium silicate is a fire retardant, and aluminum silicate is a coagulating agent. When they are mixed and dried, the mixture serves as a heat generating element (i.e. a "heating element"). When an electrical current is introduced to the heating element, the heating element heats up but does not burn. Without the sodium silicate, it will burn. Sodium silicate does not control the temperature of a heating element but rather inhibits its burning. The aluminum silicate hardens the heating element.

Most commercially available infrared heating devices are coated with a coating agent made of carbon/graphite (C) without sodium-silicate ($Na_2SiO_3$). If their base boards are made of organic materials, they tend to burn and disintegrate as their surface temperature rises to 120° C. If their base boards are made of inorganic materials, their surface heating temperature can rise to 250° C. and higher, but they start to burn and/or disintegrate at that temperature levels. Ceramic or MICA base boards can sustain such a temperature, but non-G-S based coating agent cannot. One way to achieve a higher surface temperature infrared heating device (400-700° C.) for industrial users is to imbed graphite and metal powder on the surface of a ceramic board and apply a heat treatment at 1000-1400° C. But, this manufacturing process is cumbersome and expensive, compared with the method of coating the G-S agent on a ceramic or MICA plate.

The surface temperature of infrared heating devices can be controlled by a number of factors: (1) electrical voltage, (2) compositions of coating agent, (3) thickness of coating agent, (4) length and size of heating element, (5) distance between positive and negative electrodes, and (6) type of base board. Higher electrical voltage, inorganic base board, thicker coating, and shorter length heating element accompanied by shorter distance between positive and negative electrodes are needed to produce high surface temperature heating devices. Lower electrical voltage, organic base boards with non-G-S agent, thinner coating, large and longer heating element, and longer positive and negative electrodes reduce the surface temperature.

The particular interest in this CIP patent application is the interaction between the compositions of the coating agent, the type of base board, and the distance between positive and negative electrodes. As noted earlier, the surface temperature of a heating device that is coated with a G-S agent on a large size MICA base board (about the size of 10×100 inch) can rise to 400° C. and higher without causing a fire hazard. If the size of the heating element is reduced to 5×50 inch, shortening the distance between positive and negative electrodes, surface temperature can rise to 600° C. before it starts to gradually disintegrate.

In constructing heating devices, their size and surface should be taken into account. For example, an appropriate size of infrared space heaters for personal use is more likely to be smaller (let say 12×25 inch) than the size of infrared heating boards for construction and other industrial uses (let say 50×100 inch). The appropriate surface temperature of infrared space heaters devices for personal use can range between 150° C. and 250° C., whereas that of infrared heating boards/panels for home and commercial builders can range between 200° C. and 600° C. Thus, the challenge for the inventors is to develop a set of G-S coating agents that are suitable for producing varying sizes of heating devices at desirable surface temperatures.

DETAILED DESCRIPTION OF THE INVENTION

Figure 1:
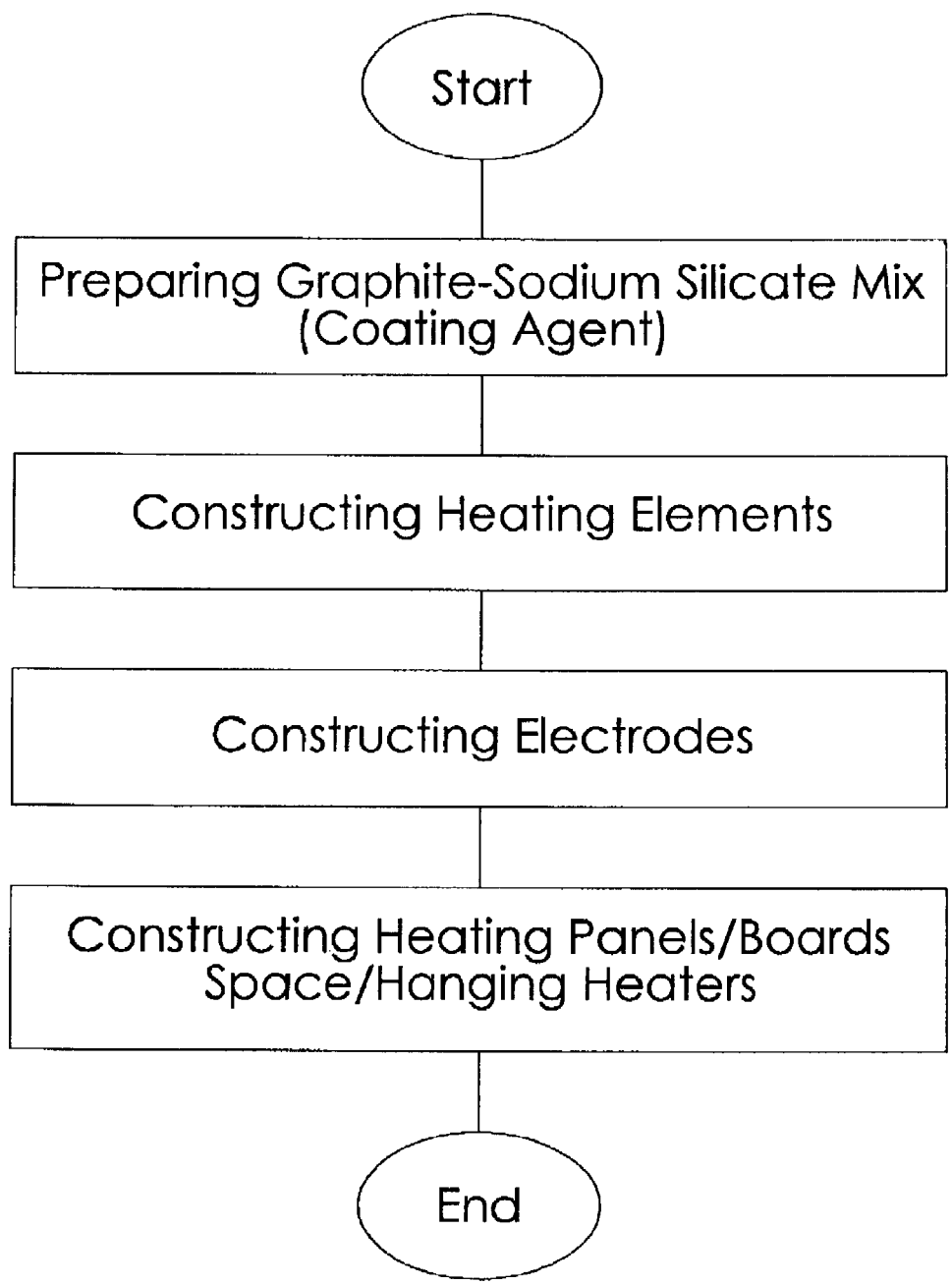
FIG. 1 shows the processes or steps by which graphite-sodium silicate (G-S) heating devices are manufactured.

A main purpose of the present invention (CIP) is to formulate a set of coating agents that are independently and collectively capable of generating a desired surface temperature for heating devices without causing a fire hazard or material disintegration or destruction. To achieve this end, we developed three types of coating agents: (1) a basic G-S agent (referred to herein as a "G-S agent"), (2) a nonconductive temperature control (T-C) agent that will be added to the basic G-S agent to control the surface temperature of targeted heating devices (referred to as a T-C agent), and (3) a modified G-S coating agent by mixing the base G-S and the T-C agents (referred to as a G-S Plus agent).

The surface temperature of heating devices can be controlled by changing the electrical voltage used, components of coating agent, size of heating board, distance between positive and negative electrodes, and others. Among these factors, the changing composition of a coating agent, mainly formulating an appropriate G-S Plus agent is the most effective and efficient way to control the surface temperature of heating devices. The electrical voltage is relatively fixed by regulations and the size of heating boards and the distance between positive and negative electrodes are determined by the type and usage of heating devices. That leaves the compositions of a heating agent (including thickness) to be the most practical way to control the surface temperature of heating devices. In the following sections, we describe (1) the compounds that are used in the G-S, T-C, and G-S Plus agents, (2) the methods of producing them, and (3) how these agents are applied to heating devices will be described in greater detail below.

G-S Agent

The G-S agent is the foundation of a heat generating element (i.e. "the heating element") of an infrared heating device that is capable of producing a surface temperature of 400° C. and up without causing fire hazard if it is coated on an inorganic base board such as ceramic or MICA. In the G-S coating agent, the following components are mixed in a ball milling tank:

| 95-98% | Graphite | 6,150 gm | |
|---|---|---|---|
| 42% | Sodium Silicate | 10,000 gm | (100% sodium silicate 4,200 gm; 100% water 5,800 gm) |
| 99% | Non-ionic Surfactant | 200 gm | |
| 99% | Isopropyl Alcohol | 800 gm | |

It is understood that the percentages of each element are a reference to a degree of purity of the substance. Graphite is used for electrical conductivity; sodium silicate is used as fire retardant and effective binder; non-ionic surfactant is to disperse the graphite in the ball milling process; and alcohol is added to prevent growth of micro-organisms in the agent. Note that in the original patent application, which is incorporated herein by reference, aluminum silicate (or aluminum sulfate) was added as a coagulating agent to prevent water damage. In the present application, if a heating device requires a coagulating agent, it will be added to the G-S agent by mixing it with a T-C agent that contains this coagulating material. As shown in the following section, a coagulating agent (such as $Al_2SiO_3$, $FeSiO_3$, $CrSiO_3$, $CuSiO_3$, $MgSiO_3$, and $MoSiO_3$) is added to the T-C agent. The alcohol is selected from the group consisting of isopropyl alcohol, ethanol, and methanol.

T-C Agent

Not all heating devices need their surface temperature to be as high as 400° C. For example, space heaters for personal use will need their surface temperatures to be around 180-200° C. If a basic G-S agent is coated on an organic space heater base board, the heater will burn as its surface temperature rises above 130° C. If it is coated on an inorganic base board, the heater may not burn but gradually disintegrate as its surface temperature rise above 500° C. In order control the surface temperature of heating devices, we developed a T-C agent. T-C agent does not conduct electricity. It is rather used as a dielectric agent to moderate the conductivity of G-S agent and to coagulate the heating element of a heating device to minimize water damage (water proofing). In this CIP patent application, the following compounds are mixed in a ball milling tank to produce a T-C agent:

| 30-33% | $FeSiO_3$ | 3,300 gm | ($FeSiO_3$ 1,000 gm; $H_2O$ 2,300 mg) |
|---|---|---|---|
| 42% | $Na_2SiO_3$ | 4,300 gm | ($Na_2SiO_3$ 1,800 gm; $H_2O$ 2,500 gm) |
| 98% | $TiO_2$ | 800 gm | |
| 95-98% | Graphite | 800 gm | |

In this CIP patent application, a metallic silicate $FeSiO_3$ (ferrosilite) is used as the main ingredient in the T-C agent to dielectric and coagulate the heating element; sodium silicate $Na_2SiO_3$ is used as a binder as well as to add fire retardant capability; titanium dioxide $TiO_2$ is added to retain color and to prevent lacing of the heating element; graphite to prevent "pop-ups" or skin eruptions of a heating element when its surface temperature rises. If the T-C agent is mixed with a G-S agent, there is no need to add the graphite because the G-S agent contains graphite. But, if the T-C agent is coated on the surface of a G-S coated heating element, graphite is needed to prevent the pop-ups on the T-C agent coated surface.

In order to obtain 30-33% $FeSiO_3$, acidic $FeCl_3$ (iron chloride) is added to alkali $Na_2SiO_3$ until the $FeSiO_3$ is neutralized at ph 7-7.5. A by-product of this mix is chemically manufactured salt NaCl. When this salt is removed by washing it out, the remaining product is a chemically neutralized 30-33% $FeSiO_3$. The reason why a chemically neutralized 30-33% $FeSiO_3$ rather than un-neutralized acidic $FeSiO_3$ is used is that if the latter is added directly to alkalic $Na_2SiO_3$, an unwanted amount of chemical salt will be produced.

G-S Plus Agent

As noted above, T-C agent can be independently coated on a G-S mixing agent coated heating element, or it can be mixed with G-S agent to produce G-S Plus agent. That means, G-S Plus agent is made of G-S and T-C agents. By changing the amount of T-C agent in G-S agent, one can easily change the surface temperature of heating devices. The higher the content of T-C agent in a G-S Plus agent, the lesser the amount of conductivity of a heating device and the harder (solid) the heating element and its surface will be. Its implication is that if one needs a higher surface temperature heating board for industrial use where water damage is no problem, he/she may use a G-S agent that is free of T-C agent. On the other hand, if one needs a moderately high surface temperature space heater for personal use, he/she may use a G-S Plus agent. In this CIP patent application, a premade G-S agent is made by mixing G-S and T-C agents in a 70:30% ratio respectively. Of course, the ration can be adjusted to produce one's preferable level of surface temperature controllability.

Although the main objective of the present invention (CIP) is to formulate a set of heat generating G-S coating agents, the ultimate objective of formulating G-S coating agents is to use them as the foundation of constructing of various G-S based heating devices. As such, it is appropriate to recite how these S-G coating agents are used in constructing such heating devices. In one embodiment of this invention, heating devices (heating panels, heating boards, space heaters, hanging heaters, etc.) are produced by performing the following steps as shown in FIG. 1: (a) Producing a graphite-sodium silicate (G-S) coating agent/mix (10), (b) preparing a heating element (30), (c) constructing electrodes (40), and (d) constructing heating panels/boards (70/80). In Step 1, a graphite-sodium coating agent (10) is produced, which will be coated on a base layer (20). In the preferred embodiment of this invention, the G-S coating agent (10) is composed of graphite, sodium silicate, aluminum silicate (or aluminum sulfate), alcohol, and surfactant. Graphite, a form of carbon, is used as the primary heat generating agent; sodium silicate and aluminum silicate are used as fire retardant agents; aluminum silicate (or aluminum sulfate) is used as a waterproofing agent; alcohol is to prevent growth of micro-organisms in the solution; and surfactant is to reduce the graphite surface tension in the milling/mixing process. In this embodiment, the compositions of 10 are as follows:

| | |
|---|---|
| Graphite | 30-40% |
| Sodium silicate | 20-30% |
| Aluminum sulfate | 5-10% |
| Alcohol | 2-3% |
| Non-ionic Surfactant | 0.1-2% |
| Water | 30-45% |

Note that when aluminum sulfate ($Al_2(SO_4)$) is mixed with sodium silicate (Na2SiO3), it produces aluminum silicate ($Al_2SiO_3$) and chemical salt ($Na_2SiO_4$). After the chemical salt is washed out, the remaining aluminum silicate functions as waterproofing agent. Aluminum sulfate is often used as a substitute for aluminum silicate, because it is a water soluble liquid that facilitates the mixing process.

The proportions of graphite, sodium silicate, aluminum sulfate, alcohol, and surfactant in a G-S coating agent (10) can be adjusted to increase or decrease the potency of the graphite's heat generating capability, the sodium silicate's fire retardant capability, and/or the aluminum's waterproofing capability. Also, the proportions of the above chemical compounds in 10 will change after the G-S mix is coated, dried, and cured on a base layer board (20) and become the core of a heating element (30). Since most of the alcohol and water will be evaporated, the remainders are likely to be graphite (60-70%), sodium silicate (30-35%), aluminum sulfate (9-10%), and others (1-2%). As stated previously, the alcohol is selected from the group consisting of isopropyl alcohol, ethanol, and methanol.

There are other inorganic carbon-contained materials (e.g., carbon black, carbon sulfur, graphite fiber, graphite carbon nitride) that can substitute for the conductive graphite. Additionally, there are other fire retardants that can substitute the sodium silicate (e.g., sodium carbonate, sodium tetra-silicate, sodium colloidal silica). The aluminum sulfate can also be substituted by aluminum hydroxide, aluminum fluoride, copper sulfate, lithium chloride, magnesium sulfate, sodium carbonate, sodium sulfate, and zinc chloride to name a few can be used as fire retardant agents. Some of these fire retardants (e.g., aluminum hydroxide, aluminum fluoride, and lithium chloride) contain waterproofing capability.

In producing the G-S mix/coating agent, this invention first prepares the graphite-sodium silicate solution (10S) and the graphite-aluminum sulfate solution (10A) before they are mixed. The 10S may include graphite, sodium silicate, water, alcohol, and surfactant; 10A is composed of graphite, aluminum sulfate, water, and surfactant. Note that both 10S and 10A contain graphite and one of the two fire retardants. Why then separate the processes of producing 10S and 10A? Graphite mixes well with the two fire retardant agents—sodium silicate and aluminum sulfate (resulting aluminum silicate). But, when an attempt is made to mix the two fire retardant agents along with graphite simultaneously, the two fire retardants quickly coagulate before the graphite can be blended with them. The separation is needed to produce high quality 10S and 10A. A related question is: Why does the G-S coating agent need the two fire retardants? The answer is that although sodium silicate and aluminum sulfate (aluminum silicate) are both fire retardants, they are different. Sodium silicate is more potent as a fire retardant than aluminum silicate, but it is easily soluble in water and, therefore, sensitive to water damage. On the other hand, aluminum silicate is less potent as a fire retardant but has waterproofing capability. Once 10S and 10A are produced, they are then mixed to produce the G-S coating agent (10).

Figure 2A:
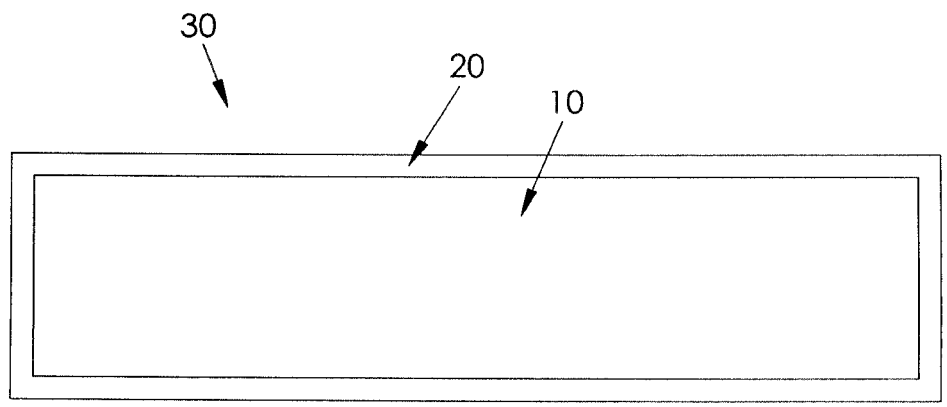
FIG. 2a is a graphic representation of a heating element on a base layer material.
Figure 2B:
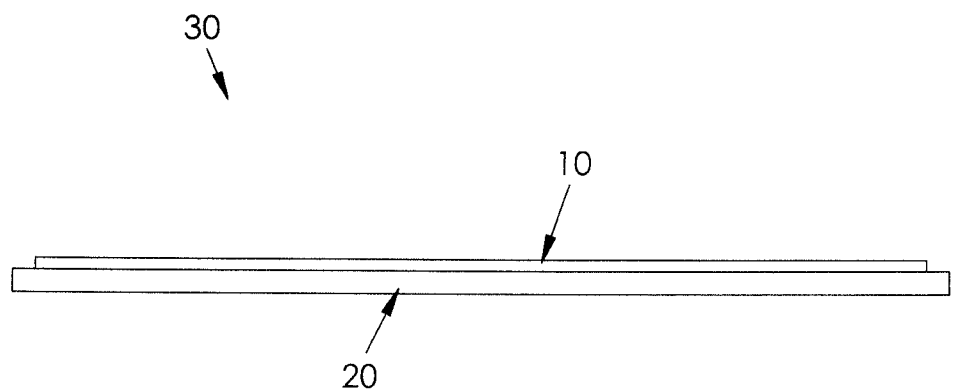
FIG. 2b is a side view of the heating element.

Step 2 is to prepare the heating element (30) by coating/laminating the G-S mix (10) on a base layer (20) such as non-woven fabric, plywood, plastic paper board, fiberglass panel, cement board, ceramic board, plaster board, metal plate and others (see FIG. 2a). In preparing for a heating element, the manufacturer first has to decide the desired surface temperature of a heating device. If a moderate temperature heating device (60°-120° C.) is desired, an organic as well as inorganic base layer can be used. On the other hand, if a high temperature heating device (120° C. and higher) is needed, an inorganic base layer such as a fiberglass, cement board, ceramic panel, plaster board, or metal panel is recommended. Second, the size of the heating element and the base layer needs to be decided. The shorter the size of a heating element/base layer, the higher the surface temperature of a heating device will be. Finally, the thickness of the G-S coating agent needs to be decided. The thicker the coating agent, the higher the surface temperature of the heating element will be. These points will be further elaborated later in Step 4.

Figure 3A:
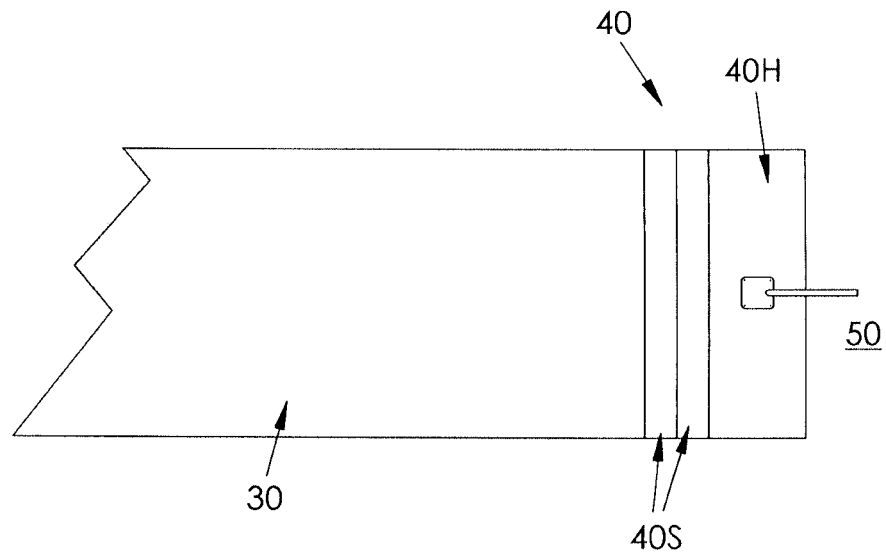
FIG. 3a is a graphic representation of an electrode.
Figure 3B:
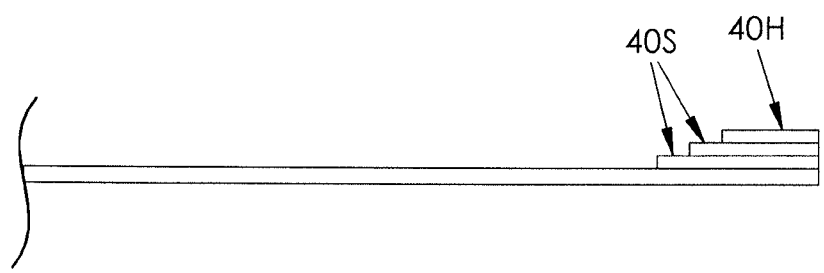
FIG. 3b is a side view of the electrode.

Step 3 is to construct electrodes (40). As shown in FIG. 3a, an electrode (40) is composed of a hard electrode part (40H) such as brass and copper plate and a soft electrode part (40S)

such as fiberglass coated with the G-S mix (10). The metallic plate (40H) is used as an electrical current collector to reduce electrical current resistance; the soft electrode (40S) is to support 40M and to facilitate electrical current dispersion (Lee & Chung, U.S. 61/743,556, Sep. 7, 2012). This invention uses fiberglass that is coated with 10 as 40S because it is an inorganic material that can bond well with the inorganic heating element (30).

In one experiment of this invention, the inventors cut the first two pieces of fiberglass in 3×21 inches, the second two pieces in 2×21 inches, and a metallic electrode with a size of 1.5×21 inches. The inventors used two layers of 40S to ensure the absorption and dispersion of electrical current in the electrode (40). The metallic electrode part (40H) has small holes (2 mm diameter and 3-5 inch interval). These holes are needed to extrude any moisture that may present in 40S. If punching holes in the metal plate is inconvenient, an expanded metal mesh (brass or copper) can be substituted for the metal plate. These three parts are glued with the G-S coating agent (10) and pressed. Note that the G-S coating agent is an excellent binder.

Figure 4A:
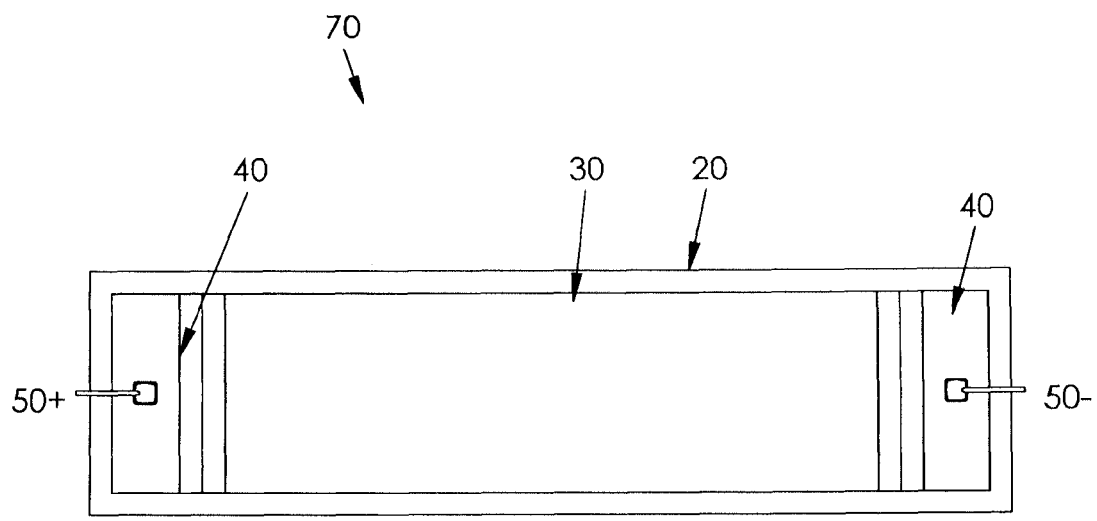
FIG. 4a is a graphic representation of a heating panel, containing a heating element, two electrodes and two electrical wires (+ and −)
Figure 4B:
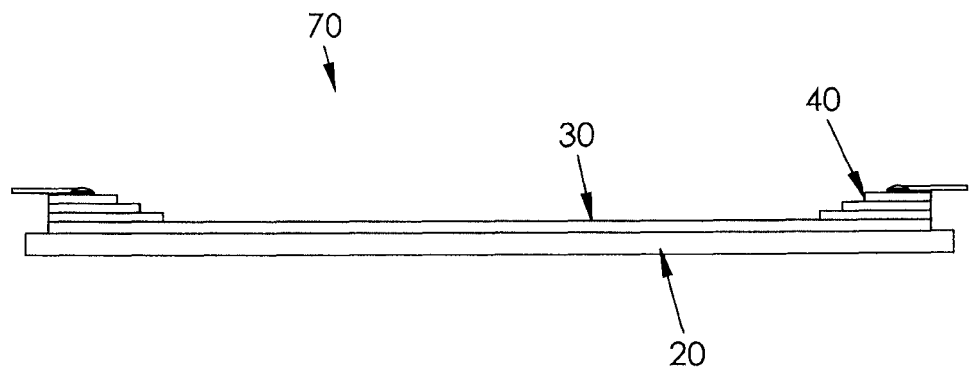
FIG. 4b is a side view of the heating panel.

Step 4 is to construct a heating panel (70) that includes a base layer material (20), a heating element (30), two electrodes (40), two electrical wires (50), and an outer protective layer (110). In the embodiment of this invention, as shown in FIG. 4a, the heating element (30) represents the G-S coating agent (10) that is coated/laminated on the base layer plywood (20). The heating panel (70) is then constructed by attaching two electrodes (40) to the heating element (30) at its opposite ends respectively and by connecting an electrical wire (50+) to an electrode (40) and the other electrical wire (50−) to the other electrode (40). Then, an outer protective layer (130) covers the heating panel (70). In constructing a heating panel (70), as pointed out in Step 2, the manufacturer first needs to decide the surface temperature of 70 that he/she wants to achieve. If a high temperature 70 (120° C. and up) is desired, an inorganic base layer such as ceramic, cement, fiberglass, plaster, or metal board should be used. If a moderate temperature 70 (60°-120° C.) is desired, inorganic as well as organic base layers can be used. Additionally, the length of a heating element matters. The shorter the length, the higher the surface temperature will be. The longer the length, the lower the surface temperature will be.

Figure 5A:
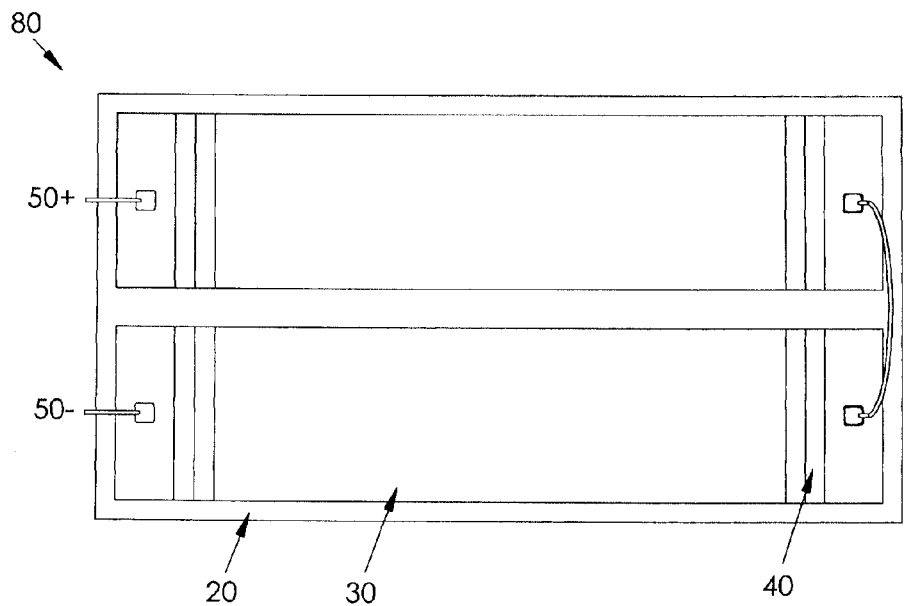
FIG. 5a is a graphic representation of a heating board showing a longer distance between positive and negative electrical wires.

In the process of developing moderate to high surface temperature heating panels/boards, this invention conducted multiple experiments. The one experiment is related to the construction of warm to moderately high surface temperature heating panels/boards. In this experiment, as shown in FIG. 5a, two 92×21 inch heating elements (30) are placed on a 96×48 inch base layer plywood board (20). The electrical wires (50) are connected in the manner that the positive (+) and the negative (−) wires are located on the same side of the heating elements, making the total length of the heating element (30) to be 184 inch. When a 120 volt electrical current is introduced to the wires, it produces a surface temperature of 30 to be 44° C. with conductivity of 13.63 ohms per inch and 6.36 amps in a room temperature of 23.6° C. Alternatively, the electrical wires (50) are connected in such a manner that the positive (+) and the negative Negative (−) wires are shown on the opposite side of the heating elements (FIG. 5b), making the distance between the positive and negative electrical fields shorter. When the distant is shorter, while keeping the thickness of 10 at 0.8 mm and the room temperature constant at 23.6° C., it produces the surface temperature of 30 at 107° C. with 4.4 ohms per inch and 7.7 amps.

Figure 5B:
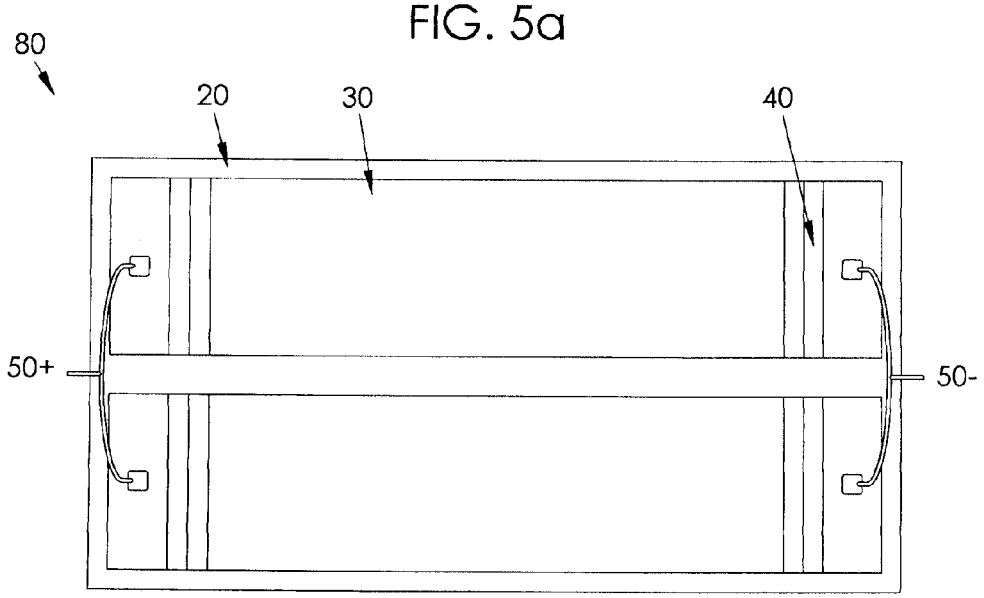
FIG. 5b is a heating board showing a shorter distance between positive and negative electrical wires.

Another experiment is related to the development of a high surface temperature (120°-240° C.) heating board. While keeping the same configuration of heating elements on a base layer board, the size of the heating board along with its heating elements are reduced in the second experiment. In this experiment, as shown in FIG. 5a, two 44×10 inch heating elements (30) are placed on a 48×24 plywood board (20), and the positive (+) and negative (−) electrical wires (50) are located at the same side, making the total length of the heating element to be 88 inches. When a 120 volt electrical current is introduced to the electrical wires (50), it produced the surface temperature of (30) to be 127°-130° C., 10-12 ohms per inch and 11 amps in a room temperature of 21.8° C. When the electrical wires are connected in such a manner that the positive (+) and negative (−) wires (50) are located on the opposite side of 30, as shown in FIG. 5b, while keeping other variables constant, the surface temperature of 30 rises to 212-230° C. with 10-12 ohms per inch and 14 amps. But, the problems is that as the temperature rises to 140° C., the organic plywood base layer starts to burn and disintegrate. When the two 44×10 inch heating elements (30) are placed on a metal panel (20), the surface temperature of 30 and 20 rises to 230° C., causing a fire risk around the heating board (80). This experiment suggests that an inorganic base layer such as plaster board, fiberglass, cement board, or ceramic board is needed to construct high temperature heating devices.

In another experiment, an attempt is made to produce a heating board to be used in a home building project where water damage is no issue because the heating board will be installed in a protective wall. The target surface temperature is around 200° C. Since the size of the MICA heating board is large (let say 25×190 inch) and water damage is no issue, the previously formulated G-S agent is coated on a MICA plate to form a heating element (21×180 inch) within the MICA plate with a thickness of 0.7 and 0.8 inch. Two metal mesh electrodes are then attached to the heating element at its opposite ends respectively. When 220V electricity is introduced to the electrodes, the heating board yields a surface temperature of 170-220° C. at 22-23 Amps and 3-3.5 square inch ohms.

In the second experimentation, an attempt is made to produce an infrared space heater for personal use where water damage can be a problem. The target surface temperature is also around 200° C. Since the size of the space heater is relatively small and water damage can be a problem when it is placed in an open space, the previously formulated G-S Plus agent is coated on a 15×30 inch MICA plate to form a heating element. By placing two 5×28 inch heating element on the MICA place, the total length of the heating element becomes 5×56 inch. Two metal electrodes are attached to the heating element at its opposite end respectively. When 220V electricity is introduced to the electrodes, the heating board yields a surface temperature between 180° C. and 210° C. with 11-12 Amps and 15-25 square inch ohms.

Still another experiment was aimed at developing a smaller but effective heating board (80). In this experiment, four 4.5×22 heating elements (30) are placed on a 24×24 plaster base board (20). The thickness of the heating elements ranges between 0.5-0.7 mm. The electrical wires (50) are connected in such a manner that the positive (+) and the negative (−) wires are shown on the same side of 30, making the total length of 30 longer. When a 120 V electrical current is introduced to the 50+ and 50− wires, it generates the surface temperature of 30 to the range of 134°-159° C. along with 4.8 ohms per inch and 5.6-7 amps. When the 50+ and 50− electrical wires are connected in such a manner that the positive (+) and negative (−) are shown on the opposite ends of 30, the heating board's surface temperature goes up to higher than 400° C.

Why do we place two or more heating elements (30) on a base layer board (20) rather than one long heating element (30) on a long base board (20)? It is because the surface temperature of a heating element (30) depends on its length rather than the length of a base layer board (20). The longer the length of 20, the longer the distance between positive (+) and negative (−) electrical wires or electrodes will be, lowering the surface temperature of a heating board (80). For example, placing two 21×92 inch heating elements (30) side by side on a 24×96 heating board (80) is more effective and efficient than a 21×184 inch heating element on a 24×190 inch heating panel (70). Note here that a heating device containing one heating element is called a heating panel (70); a heating device containing two or more heating elements is called a heating board (80). Depending on how electrical wires arranged, as shown in FIG. 5a and FIG. 5b, the user can control the distance between positive and negative electrical fields and thus control the surface temperature of a heating device. The heating board (80) gives such flexibility as well as an economic efficiency in using the base layer board (20).

Figure 6:
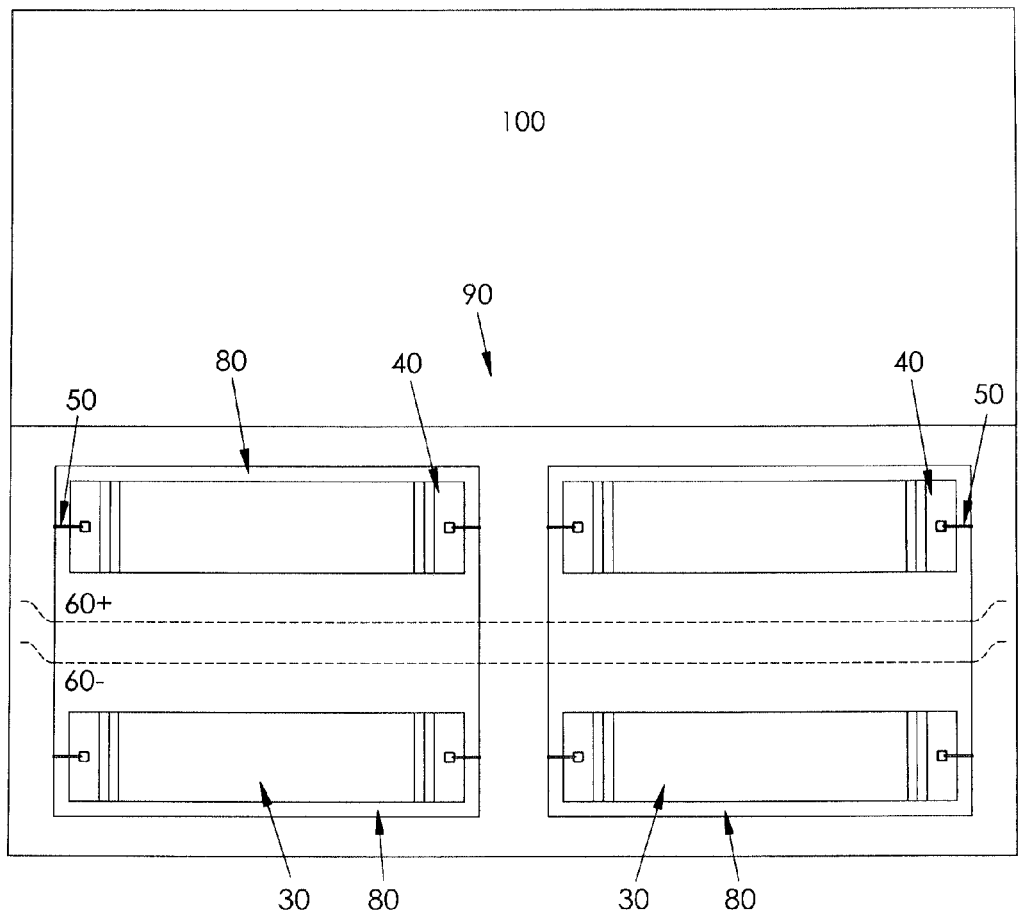
FIG. 6 shows an arrangement of heating boards on a wall.

FIG. 6 shows an arrangement of wall heating boards (90). This invention places two or more heating boards (80) side by side on the lower part of a wall (100) in a room. To give flexibility, these heating boards (80) can be individually and/or collectively wired to the main electrical lines (60). The user can control the distance between positive and negative electrical wires (50) by either locating them on the same side or opposite ends. Locating them on the same side will lengthen the distance, while locating them on opposite ends will shorten the distance. By shortening the distance between positive and negative electrical wires/electrodes, the user can achieve a higher surface temperature in the heating boards. In contrast, when the electrical wires are arranged to make the distance longer, a lower surface temperature can be achieved.

Figure 7:
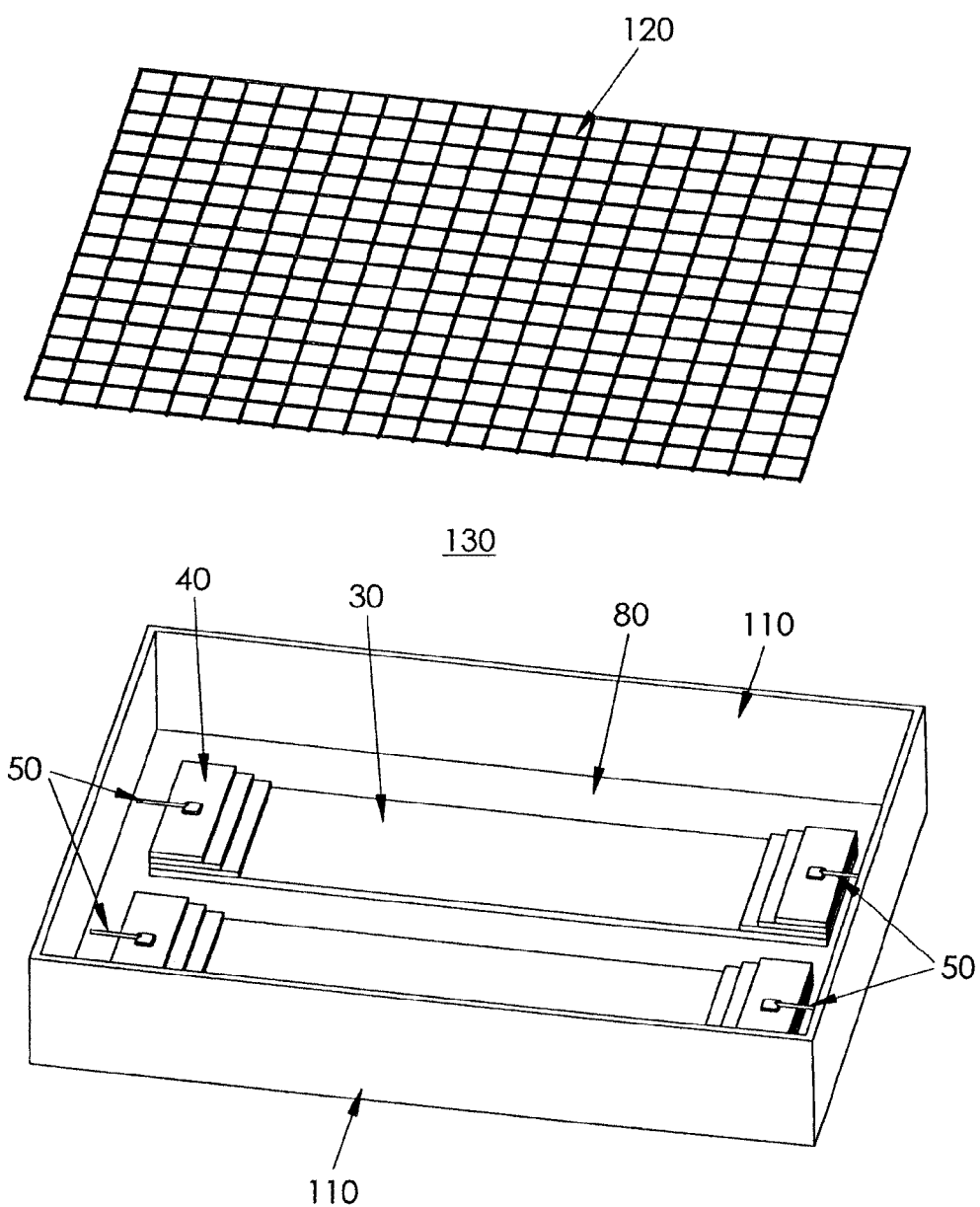
FIG. 7 is a graphic representation of a space/hanging heater.

While the heating boards (80) can be permanently installed into a wall, the same heating boards can be used as space heaters or hanging heaters by making them independent of other heating devices. As independent stand-alone heating devices, they can be easily moved around in a room where heating is desired. They can be temporarily placed on a wall or in air. FIG. 7 shows a graphic representation of a space/hanging heater (90). A space/hanging heater (130) is composed of a heating board (80), an open box made of metal or wooden (110), and an outer protective layer (120) made of metal screen or metal expanded mesh. In 130, the heating board (80) is placed at the bottom of the open box (110), and the outer protective cover (120) is placed on the top of the open box (110). This space heater (130) can be located anywhere in a room where heat is needed. The same space heater becomes a hanging heater if it is placed on a wall or hung in air.

An industrial dryer is created by installing a drying rack or racks in a space heater. In an embodiment of this invention, an industrial dryer is composed of a heating board, an open box, a drying rack or racks, and an outer protective cover. Herein, the heating board is placed at the bottom of the open box; the depth of the open box can be anywhere between 10 to 20 inches and even higher if needed; one or more metal drying rack(s) or expanded mesh is/are located starting at about 3 to 5 inches above the heating board with 3-5 inch interval; an outer protective cover (an expanded mesh) is placed on top of the box. The materials such as vegetables, fabrics, chemical compounds and others will be laid on the drying rack as well as on the outer protective cover.

Although the heating devices described above have been mostly targeted for heating rooms in a house or building, it should be understood that the ideas herein can be applied to various household as well as industrial applications including heating floor mats, food warmers, industrial hydrators, melting snow/ice on driveways, melting snow/ice on airport runways, heating buildings requiring anti-static walls and floors, and others. The heating devices, production methods, and drawings disclosed herein are not intended to limit the present invention to be used only in certain preferred embodiments.

The coating agents disclosed above can be independently and collectively used to produce space heaters for personal use and heating boards/panels to keep homes, offices, plants, and greenhouses warm. Further, the coating agents can be coated on a ceramic tile to be used as a microwave absorption device. Further, the coating agent can be used as an electrical absorption device. In addition, the coating agent can be coated on a metallic object as a protective paint, especially in a high temperature environment.

Therefore, nothing in the disclosure herein will limit the scope of the invention, which is susceptible to various alterations, imitations, and modifications without departing from the scope of the invention.

It is understood that while certain forms of this invention have been illustrated and described, it is not limited thereto except insofar as such limitations are included in the following claims and allowable functional equivalents thereof.

What is claimed is:

1. A heat generating fire retardant coating agent comprising a mixture of:
    (a) 30-40% of an inorganic carbon-containing material;
    (b) 20-25% of a composition comprising sodium silicate, sodium carbonate, sodium tetra-silicate, or sodium colloidal silica;
    (c) 5-10% of a compound selected from the group consisting of aluminum silicate, aluminum sulfate, aluminum hydroxide, aluminum fluoride, copper sulfate, lithium chloride, and magnesium sulfate;
    (d) 2-3% of an alcohol selected from the group consisting of isopropyl alcohol, ethanol, and methanol;
    (e) 0.1-1% of a non-ionic surfactant; and
    (f) 30-40% water.

2. The heat generating fire retardant coating agent of claim 1, wherein the inorganic carbon-containing material is selected from the group consisting of graphite, carbon black, graphite fiber, and graphite carbon nitride.

3. The heat generating fire retardant coating agent of claim 2, wherein the inorganic carbon-containing material is graphite.

4. The heat generating fire retardant coating agent of claim 1 wherein the composition comprises $Na_2SiO_3$.

5. The heat generating fire retardant coating agent of claim 1 wherein the compound is aluminum silicate or aluminum sulfate.

6. The heat generating fire retardant coating agent of claim 1 wherein the alcohol is isopropyl alcohol.

7. A basic heat generating coating agent comprising:
    (a) 30-40 wt % of an inorganic carbon-containing material;
    (b) 20-30 wt % of a composition comprising a sodium silicate;
    (c) 2-7 wt % of an alcohol selected from the group consisting of isopropyl alcohol, ethanol, and methanol;
    (d) 0.1-1 wt % of a non-ionic surfactant;
    (e) 30-40 wt % water;

wherein the inorganic carbon-containing material, the composition comprising a sodium silicate, the non-ionic surfactant and the alcohol are mixed together in the water to form a solution.

8. The heat generating coating agent of claim 7, wherein the composition comprising sodium silicate comprises 42% pure sodium silicate.

9. The heat generating coating agent of claim 7, further comprising a metallic silicate selected from the group consisting of $AlSiO_3$, $CuSiO_3$, $FeSiO_3$, $MgSiO_3$, $MoSiO_3$, and $CrSiO_3$.

10. The heat generating coating agent of claim 7 wherein the alcohol is isopropyl alcohol.

11. The heat generating coating agent of claim 7, wherein the inorganic carbon-containing material is selected from the group consisting of graphite, carbon black, graphite fiber, and graphite carbon nitride.

12. The heat generating coating agent of claim 7, wherein the inorganic carbon-containing material is graphite.

* * * * *